Figure I.

3,056,724
THERAPEUTIC PELLETS FOR RUMINANTS
Hedley Ralph Marston, St. Peters, South Australia, Australia, assignor to Commonwealth Scientific and Industrial Research Organization, East Melbourne, Australia
Filed Sept. 24, 1958, Ser. No. 763,125
Claims priority, application Australia Nov. 5, 1956
10 Claims. (Cl. 167—53)

This invention relates to pellets for supplying small amounts of biologically active substances, e.g., nutritional or therapeutic substances, to ruminants over an extended period of time, the pellets being especially adapted for the supply of trace elements, anti-bloat agents, antibiotics, anthelmintics, hormones or any such drug, nutritional adjuvant or biological product which produce a beneficial effect when released into the animal's alimentary tract in suitable quantities.

The invention may be considered in relation to a particular problem of animal husbandry, viz. that involved in the provision of the very small quantities of cobalt necessary to maintain normal health in sheep and cattle confined to cobalt-deficient fodder, or, in other circumstances, to protect them from the fatal malady, Phalaris staggers, when their grazing is confined to the new growth of the perennial pasture grass, *Phalaris tuberosa*. To effectively treat cobalt deficiency arising from these causes the means of administering the required cobalt supplement should ensure that the cobalt in solution within the rumen contents is kept continually above a certain limiting concentration. Current husbandry practices employed to meet this requirement entail frequent dosing which, in turn, necessitates much costly handling of the flocks and herds. The invention provides means for supplying cobalt to ruminants in such manner as to eliminate substantially the disadvantages of the present practice involved in frequent dosing of the animals. The applications of the invention extend, however, far beyond the treatment and prevention of cobalt and similar deficiency conditions in cattle and sheep, and embrace the supply of nutritional or therapeutic substances in general.

According to the invention there is provided pellets for administration to ruminants to supply them with biologically active substances for an extended period of time, said pellets embodying a biologically active substance and having a density and weight and durability which relatively permanently retains the pellets in the rumeno-reticular sac of the animals after administration and lodgment in the sac, the biologically active substance being free for release from the pellets into the contents of the sac over the extended period of time.

Each pellet in accordance with the invention should be small enough to be swallowed by the animal after administration or be conveniently introduced into the rumeno-reticular sac through the skin and subcutaneous tissues and should be dense enough and heavy enough to lodge in the rumeno-reticular sac and remain there rather than pass into the alimentary tract and be eliminated, which otherwise would occur. Durability of the pellets in the rumeno-reticular sac, over the extended period of time, is a characteristic of them, in that their physical form is substantially retained over that period, the biologically active substance being relatively slowly released from the pellets mainly by erosive action within the rumeno-reticular sac. The pellets should, of course, contain an amount of the biologically active substance sufficient to supply the substance over the extended period of time at an appropriate rate for the purpose in hand.

The density of the pellets can be as low as 2.5 but should be at least 3.5 and the weight or size sufficient for the purpose specified. In practice, the density is conveniently within the range of 2.5 to about 1 and the weight conveniently within the range of about 75 grams to 1 gram, the preferred weight for general purposes being in the order of 30 grams to about 5 grams, and the preferred density between 3.5 to 5.5.

Density is the most important factor affecting retention of the pellets in the rumeno-reticular sac, but weight (and therefore size) has a bearing from the practical aspect, mainly with respect to the amount of biologically active substance required for the animal over the period of treatment. Unless the density of the pellets is above the indicated critical limit, an undesirably large proportion will be shed by the ruminants. Even though the pellets may be above the critical density, unless they are each of an appropriate minimum weight, related to the density, too many may again be shed to make use of the pellets of practical value. Adequate weight is a significant factor of pellet retention when pellets of a density at or near the critical limit of 2.5 are used. Thus, retention is improved as weight is increased when the density is at or near the critical limit of 2.5, however, when the density is higher than about 3.5 an increase in the weight of the pellets does not markedly improve the retention factor. In any case, as indicated, the amount of biologically active substance needed for release during the period over which in general the substance is to be supplied to the animal is such as to require that the size of the pellet be substantially in excess of the minimum weight of 1 gram.

Experiments conducted on sheep and cattle concerning the factor of pellet retention indicate that for them the critical minimum density of the pellets is about 2.5. Some pellets having a density below this figure will be retained by these animals, but too high a proportion will be shed to make less dense pellets of practical value. The density may be as high as is practicable, but, as indicated it is preferred that it be between 4.0 and 4.5. The upper limit for the density is not critical, and it may be stated that the higher the density the better, so far as retention is concerned. The upper practical limit is in general set by pellet-formulation technique and facilitates, as relatively few biologically active chemicals of value according to the concept of this invention have densities of 7 or greater. On the other hand, it is possible to achieve pellet densities as high as 7 or even greater, by means of a metallic sheath or shell or core, or a matrix embodying metallic particles, all forming part of the pellet and having a density exceeding 2.5 as hereinafter more fully described.

For sheep, the minimum weight of a pellet which it has been found will be retained at a density of 4 is in the order of 1 gram, however, it is much preferred that the weight of the pellet be 4 grams to 5 grams. At the preferred density of 4, a weight of 4 to 5 grams is equivalent in size to a domed-ended cylinder of approximately ½" diameter by ½" length. The maximum size of pellets for sheep are determined by the practical difficulties of administering large objects to sheep. A cylinder ½" diameter by 2" length is as large as it is preferred to give without risk of damage to young lambs at weaning. The weight of such a pellet will vary according to the density of the material, but at the minimum permissible density of 2.5, it will have a weight of approximately 15 grams. Larger pellets may, of course, be given to older sheep, although it would be preferable to increase the diameter rather than the length. Overall, pellets of from 1 to 30 grams can be used for sheep.

For cattle, the minimum weight of pellet which it has been found will be of practical value at a density of 4 is in the order of 5 grams, however, it is preferred that they be about 20 grams. Pellets having a weight as low as 5 grams may be used for a relatively short-term period of administration of the biologically active substance, however, in general the body weight of cattle is such as to indicate the use of pellets of 20 grams or more in weight. Pellets of 10 grams and a density of 4 are equivalent to a cylinder ½" diameter by 1" length. Again the upper limits of size are determined by the practical convenience of dosing calves. Pellets of ¾" diameter by 2" in length are as large as it is convenient to give to calves 4–6 months of age; the weight of such pellets will vary according to the density of the material, but at the minimum permissible density of 2.5, they will weigh approximately 37 grams. Overall, pellets of 5 to 75 grams can be used for cattle.

In general, the pellets of the invention may consist of a high-density biologically active substance (the term 'high-density" so used means a substance having a density of at least 2.5 and preferably higher, say, 3.5 to 5.5) the particles of which have been compressed into pellet form. The pellets may also consist of a high-density biologically active substance, the particles of which are contained within an open-ended or closed-ended low-density sheath or shell (the term "low-density" so used means a shell, the material of which has a density no higher than that of the biologically active substance and in most instances is considerably less), the particles of the biologically active material being free to leach or diffuse from or through the shell. Alternatively, the pellets may consist of a low-density biologically active substance (the term "low-density" so used means a substance having a density less than 2.5), the particles of which are embodied in a high-density matrix (the term "high-density" so used means a density of at least 2.5 and preferably higher, say, 3.5 to 5.5) such as by moulding or compressing together particles of the biologically active substance and the matrix into pellet form, or by permeating pellets of the matrix with the biologically active substance. Again, the pellets may consist of a low-density biologically active substance embodied in a high or low density matrix and this mixture contained with a low or high density sheath or shell of the kind specified. The pellets may also consist of a low-density biologically active substance the particles of which are moulded or compressed around a high density core. The pellets may further consist of a low-density biologically active substance embodied in a low-density or high-density matrix, the particles of which mixture are moulded or compressed around a high density core. In all such instances, the pellets have a mean density and weight as specified above.

The term "pellet" as used herein includes bodies which on the exterior are generally cylindrical, spherical, spheroidal, or other shape or form appropriately rounded and preferably devoid of sharp edges and protuberances.

For general purposes, in cases where the pellets consist of compressed particles of a high-density biologically active substance, or compressed particles of a high or low density biologically active substance embodied in a low or high density matrix, the preferred shape of the pellet is cylindrical or rod-form which domed ends, as such shapes are conveniently fabricated by conventional compressing machines such as tabletting machines, presses, and the like, and do not have sharp edges which may injure the animal. However, any other shape, spherical for example, may be utilized, provided that such shape does not have sharp edges or protuberances which may result in injury to the animal during administration and lodgment in the sac. Pellets of this kind should be so compressed as to be hard and incapable of crushing or deforming other than by exceptional pressure.

Practical examples of pellets which are of the requisite density according to the invention, due to the density of the biologically active material, are cobalt oxide and copper oxide, which materials can be administered to the animals to rectify cobalt and copper deficiencies. Thus, when cobalt oxide is mixed with 25% by weight of a plastic binder or base such as clay and compressed, pellets of a density from about 3.2 to 3.5 are produced. Heating to a high temperature, say about 1000° C., causes a reaction to take place which binds the mixture into a hard porous mass. When only 10% by weight of clay is incorporated with the cobalt oxide, the density is about 4.0 to 4.1. Other binders such as gums, sodium silicate, and polyvinyl acetate, may be used in place of or in combination with the clay. Thus, the biologically active substance can be a cobalt compound for release of cobalt ions into the contents of the rumeno-reticular sac, and the pellets can be moulded from a mixture of clay and the cobalt compound and baked at a temperature to form pellets having a cobalt-release rate into the contents of the sac of at least 0.1 milligram per day, as hereinafter more fully described. Copper oxide pellets made in a similar way and containing 85% by weight of copper oxide, have a density greater than 4. Cuprous iodide mixed with 10% by weight of polyvinyl acetate gave pellets having a density of 2.9. A variation of this is a pellet of iodine, having a density of 4, enclosed in a sheath or envelope of polyethene of .005" thickness, so that the iodine does not irritate the rumen wall but diffuses slowly through the polythene shell into the rumen contents.

Practical examples of pellets which consist of a relatively low-density biologicallly active substance embodied in a relatively higher density matrix are cobalt oxide pellets mixed with iron powder to increase the density. Pellets of this kind, containing 10% by weight of clay and 50% by weight of iron powder have a density of 4.6. Other materials which may be used as a matrix are cement, plaster of Paris, magnesium oxychloride cement, zinc oxychloride cement, and, zinc oxyiodide cement, the density of which may be further increased by the addition of iron powder or zinc powder. The low-density biologically active substance may be stilboestrol, dieldrin, penicillin, or iodine in the form of zinc oxyiodide.

A practical example of a pellet which consists of a low-density biologically active substance contained within an open-ended or closed-ended high-density shell allowing leaching or diffusion of the active substance from or through the shell, is an open-ended metal sheath or tube filled with the biologically active substance, the metal sheath or tube acting as a shell for the active substance. Thus, a copper tube filled with a mixture of procaine penicillin, Carbowax 4000, and stearic acid, has a mean density of 4.3. According to another practical example, a closed-ended metal sheath or tube forms a shell for a low-density or high-density biologically active substance enclosed therein, a wick or like device being provided for gradual release of the material into the rumen contents. A practical example of a pellet of a low density biologically active substance the particles of which are moulded or compressed around a high-density core, is a metal core having an outer layer of the biologically active substance. Thus, an iron rod or steel ball or roller bearing has a covering of a cement containing stilboestrol.

The following Experiments 1 to 5 serve to illustrate the general mechanics of retention of objects in the rumeno-reticular sac:

*Experiment 1*

Five groups each of 80 sheep were given (by oesophageal tube) a pellet selected from the materials below. All pellets were observed to be in the reticulum or rumen on the day after administration by X-ray screening. Re-screening of the 400 sheep at subsequent monthly intervals revealed that some sheep had lost their pellets as follows:

TABLE I

| Nature of pellet (cylinders with domed ends) | Specific gravity (S.G.) | Weight (gms.) | Percent missing after— | | | |
|---|---|---|---|---|---|---|
| | | | 1 month | 2 months | 3 months | 4 months |
| Aluminium, ½″ x ½″ | 2.7 | 4.2 | 7 | 7 | 0 | 1.25 |
| Aluminium, ½″ x ¼″ | 2.7 | 1.5 | 23 | 18 | 13 | 10 |
| 90% cobaltic oxide 10% clay, ½″ x ½″ | 4.0 | 5.0 | 0 | 0 | 0 | 0 |
| Steel, ½″ x ½″ | 7.7 | 11.0 | 0 | 0 | 0 | 1.25 |
| Steel, ½″ x ¼″ | 7.7 | 4.5 | 2.5 | 0 | 0 | 1.25 |

[1] After each screening missing pellets were replaced by others of the same kind.

*Experiment 2*

Three groups of sheep were taken at three different field locations and to each sheep in each group was administered by oesophageal tube one cobaltic pellet having a density of 3.4 and a total weight 5 grams in the shape of a cylinder approximately ½″ diameter by ½″ length.

Each group of sheep was examined by X-ray fluoroscope eight to twelve weeks after the pellets had been administered during which time they had been grazing under normal field conditions. The findings were:

Station A: 70 sheep treated—none had lost the pellets 8 weeks after administration.
Station B: 223 sheep treated—three had lost the pellets 8 weeks after administration.
Station C: 126 sheep treated—two had lost the pellets 12 weeks after administration.

Losses of pellets continued until at eight months after administration up to 40% of the pellets had been rejected by some groups.

*Experiment 3*

Forty-two sheep (ewes) were brought from normal grazing and each dosed simultaneously with ten pellets, each pellet being a cylinder approximately ½″ diameter by ½″ length. The pellets were administered into the oesophagus in two lots of five by means of an oesophageal tube. The pellets administered ranged in density from 0.8 to 8.0 and varied in surface from a normal smooth surface to a roughened surface (obtained by mechanical abrasion with an appropriate instrument).

The sheep were held in pens and fed oaten chaff during the 24 hours of observation after which they were returned to normal grazing.

TABLE II

| Nature of pellet (cylinders with domed ends) | Specific gravity | Weight (grams) | Surface | Hours after dosing | | | |
|---|---|---|---|---|---|---|---|
| | | | | 1 | 2 | 3 | 24 |
| | | | | Rejected | | | |
| Wood | 0.8 | 1.15 | Painted | 3 | 5 | 6 | 16 |
| | | | Plain | 3 | 3 | 4 | 10 |
| Perspex [1] | 1.2 | 1.75 | Normal | 5 | 10 | 11 | 19 |
| | | | Roughened | 9 | 14 | 14 | 17 |
| Aluminium | 2.7 | 4.4 | Normal | 0 | 0 | 0 | [2] 1 |
| | | | Roughened | 0 | 0 | 0 | 1 |
| 90% Cobaltic oxide 10% clay | 4.0 | 5.0 | Normal | 0 | 0 | 0 | 0 |
| | | | Roughened | 0 | 0 | 0 | 0 |
| Steel | [3] 8.0 | 12.0 | Normal | 0 | 0 | 0 | 0 |
| | | | Roughened | 0 | 0 | 0 | 0 |

[1] "Perspex" is a registered trademark.
[2] Found in paddock 13 days after dosing.
[3] Only 25 sheep treated with these pellets.

This experiment was continued for a further 60 days after which time 19 sheep were slaughtered and their rumeno-reticular sac searched for a pellet. Results were:

| Nature of pellet (cylinders with domed ends) | Surface | Specific gravity (S.G.) | Weight, grams | Pellets recovered/ pellets administered | Percent loss |
|---|---|---|---|---|---|
| Wood | Painted | 0.8 | 1.15 | Nil | 100 |
| | Plain | 0.8 | 1.15 | Nil | 100 |
| Perspex | Smooth | 1.2 | 1.75 | Nil | 100 |
| | Roughened | 1.2 | 1.75 | Nil | 100 |
| Aluminium | Smooth | 2.7 | 4.4 | 12/19 | 37 |
| | Roughened | 2.7 | 4.4 | 11/19 | 42 |
| Cobalt oxide 90% clay 10%. | Smooth | 4.0 | 5.0 | [1] 36/38 | 5 |
| | Roughened | 4.0 | 5.0 | | |
| Steel | Smooth | 8.0 | 12.0 | 11/12 | [2] 8 |
| | Roughened | 8.0 | 12.0 | 11/12 | [2] 8 |

[1] It was found impossible to identify the cobalt oxide pellets as rough or smooth because the surface of all had been slightly eroded and all had the same appearance after 60 days in the sheep.
[2] 1 pellet.

*Experiment 4*

Nine sheep were confined in individual pens and fed chopped oaten hay. Each sheep was given by oesophageal tube artificial pellets of four different types and various sizes of each type as follows:

Perspex pellets
Aluminium pellets
Aluminium pellets with a sleeve of plastic material
Aluminium pellets coated with a water-repellant silicone resinous film.

Rejection of pellets on to a clean concrete floor was then recorded daily and results were:

| Nature of pellets | Weight, grams | Days after dosing | | | | | | |
|---|---|---|---|---|---|---|---|---|
| | | 1 | 2 | 3 | 5 | 7 | 9 | 11 |
| | | Number shed | | | | | | |
| Perspex (S.G.=1.2): | | | | | | | | |
| ½″ sphere | 1.1 | 4 | 8 | 8 | 8 | 8 | 8 | 8 |
| ½″ x ½″ cylinder | 1.6 | 3 | 7 | 7 | 8 | 8 | 8 | 8 |
| ½″ x ½″ (wettable) | 1.7 | 4 | 6 | 6 | 7 | 7 | 7 | 7 |
| ½″ x ¾″ | 2.5 | 7 | 9 | 9 | 9 | 9 | 9 | 9 |
| ½″ x 1″ | 3.5 | 5 | 8 | 8 | 8 | 8 | 8 | 8 |
| ¾″ x ½″ | 3.8 | 4 | 5 | 6 | 6 | 6 | 6 | 7 |
| Aluminium (S.G.=2.7): | | | | | | | | |
| ½″ sphere | 2.9 | 0 | 0 | 0 | 1 | 1 | 1 | 1 |
| ½″ x ½″ cylinder | 4.4 | 1 | 1 | 1 | 1 | 1 | 2 | 2 |
| ½″ x ¾″ cylinder | 6.6 | 0 | 0 | 0 | 0 | 0 | 1 | 1 |
| ½″ x 1″ cylinder | 8.2 | 0 | 0 | 0 | 0 | 0 | 0 | 1 |
| ¾″ x ½″ cylinder | 10.3 | 0 | 0 | 0 | 0 | 0 | 1 | 1 |
| ¼″ x 1¼″ cylinder | 2.7 | 1 | 1 | 1 | 1 | 1 | 1 | 1 |
| Aluminium plus sleeve of plastic (S.G.=2): | | | | | | | | |
| ½″ x ½″ cylinder | 3.5 | 4 | 6 | 6 | 6 | | | |
| ½″ x ¾″ cylinder | 4.75 | 5 | 5 | 5 | 6 | | | |
| ½″ x 1″ cylinder | 6.25 | 5 | 7 | 7 | 7 | | | |
| ½″ x 1½″ cylinder | 10.0 | 4 | 6 | 6 | 6 | | | |
| ½″ x 2″ cylinder | 12.5 | 2 | 4 | 4 | 5 | | | |
| Aluminium plus silicone resin coating (S.G.=2.7): | | | | | | | | |
| ½″ sphere | 2.9 | 1 | 1 | 1 | 1 | 1 | | |
| ½″ x ½″ cylinder | 4.4 | 0 | 0 | 1 | 1 | 1 | | |
| ½″ x ¾″ cylinder | 6.6 | 1 | 1 | 1 | 1 | 1 | | |
| ½″ x 1″ cylinder | 8.2 | 0 | 0 | 0 | 0 | 0 | | |
| ¾″ x ½″ cylinder | 10.3 | 0 | 0 | 0 | 0 | 0 | | |
| ¼″ x 1¼″ cylinder | 2.7 | 2 | 0 | 2 | 2 | 2 | | |

This experiment was continued by examining the difference which a different type of feed makes to rejection of pellets of a particular density; aluminium artificial pellets of a density of 2.7 were selected—the aluminium silicone treated pellets which had been shed above were re-administered and the diet of the sheep changed from oaten chaff to fresh green grass plus lucerne cut by a scythe type mower so that the natural long fibres were maintained. This cut grass (6″–8″ long approximately) was then fed to the sheep in pens. It was found that the longer fodder caused more pellets to be rejected:

| | Pellets rejected in— | | | | | |
|---|---|---|---|---|---|---|
| | 3 days | 4 days | 5 days | 3 days | 4 days | 5 days |
| | Aluminium | | | Aluminium silicone treated | | |
| Oaten chaff (approx. ¼" long) | 2 | 3 | 3 | 4 | 5 | 5 |
| Long grass and lucerne | 7 | 9 | 9 | 12 | 12 | 13 |

This illustrates that type of fodder (fibre length) can influence rejection rate.

*Experiment 5*

Twenty-six steers were each dosed with ten different artificial pellets by means of an oesophageal tube, so that the pellets were delivered into the oesophagus low in the neck. A previous test wherein cattle were dosed in this way and immediately slaughtered had shown that dosing in this way results in the pellets being conveyed promptly to the rumeno-reticular sac. Nineteen days after administration, thirteen of the beasts were slaughtered and the contents of the rumeno-reticular sac searched for the pellets; seventy-five days after administration, the remaining thirteen beasts were slaughtered and a similar search made. Results were:

| Nature of pellets | Density | Dia. x length, ins. | Weight, grams | Number missing after— | |
|---|---|---|---|---|---|
| | | | | 19 days | 75 days |
| Aluminium | 2.7 | ½ x ½ | 4.5 | 5 | 6 |
| | | ½ x 1 | 9.0 | 1 | 4 |
| | | ¾ x ¾ | 15.0 | 3 | 3 |
| | | ¾ x 1 | 25.0 | 1 | 1 |
| Cobalt oxide/clay (composition) | 4.0 | ½ x ½ | 5.0 | 2 | 0 |
| | 3.8 | ½ x 1 | 12.0 | 0 | 0 |
| | 3.8 | ¾ x ¾ | 20.0 | 0 | 0 |
| | 3.8 | ¾ x 1 | 30.0 | 0 | 0 |
| Iron | 7.7 | ½ x ½ | 10.0 | 0 | 1 |
| | | ¾ x 1 | 70.0 | 0 | 0 |

The above experiments establish that the mean density is of prime importance in determining whether or not a pellet can be expected to remain within the rumeno-reticular sac to which it normally migrates after being administered. The experiments also show that weight (and accordingly, size) is also of importance in determining whether or not the pellet is likely to be retained. It is accordingly clear that, regardless of the nutritional or therapeutic substance to be administered by means of a pellet according to the invention, the pellet itself must comply with the physical requirements as to density and weight.

In the case of a trace element or other nutritional substance of this kind, pellets in accordance with the invention should preferably be effective for a period of at least a month, and because the quantity of mineral trace elements required by ruminanats is relatively minute, it is possible by means of this invention to provide such elements in a form as will last an animal for a considerable period, in excess of one year for example, and in some cases throughout the life of the animal. Trace elements which may be administered in this way are, inter alia, cobalt, copper, molybdenum, iron iodine, boron, vanadium and manganese. In the case of a therapeutic substance or the like, pellets should preferably remain effective for a period of two weeks and normally for a considerably longer period, depending on the nature of the therapeutic substance.

Growth supplements such as hormones are generally only required over a certain "fattening out" period of three to six months. The amount of material required to cover such a period may be conveniently provided in one pellet, but larger pellets or more than one pellet may be given to provide growth stimulation over longer periods. Stilboestrol and hexocestrol are suitable hormones for use in pellets of this type.

Anthelmintics may also be administered in pellets according to the invention. Depending on seasonal conditions and on the type of drug chosen, the effective period may range from say three months to cover the seasonal conditions when eggs hatch into larvae or alternatively continuous protection over a full 12 months cycle.

Antibiotic pellets may be used to provide an effective level of drug in the tissues of an animal over that period which an infection is normally expected to last, say for two weeks, possibly up to three weeks. The advantage of this form of treatment is that one administration is adequate compared with the present need for repeated injections and/or oral dosing. Alternatively it may be possible to provide a continuous low level of sulphonamide or antibiotic medication extending over a period of say three months or more to reduce incidental infections and ailments which, although rarely fatal to the animal, can retard growth and development. Antibiotics which may be incorporated in pellets according to the invention are penicillin, chlortetracycline, tetra-cycline, oxytetracycline and the like while sulphonamides such as sulphadimidine or sulphadiazine may also be used.

Anti-bloat agents which are effective by their anti-frothing property may also be incorporated in the pellets to provide protection to an animal over a period when bloat is normally a problem—a period ranging from six weeks to about three months. Certain types of silicones such as methyl-silicones, or acetbutylate, or polyoxyethylene derivatives of ricinoleic acid are some of the anti-frothing agents which may be incorporated in pellets according to the invention. Penicillin, by alteration of rumenal microflora, has also been found effective in the control of bloat.

Pellets according to the invention may also contain systemic insecticides which are capable of preventing attack by various external parasites such as the warble fly larvae. The advantages of combating external parasites by means of an oral pellet over the presently used dipping procedures are that the animal is subject to much less shock and resultant loss of condition. It is desirable to provide in one pellet enough drug so that animals would only require to be dosed either once or twice a year, depending on the life cycle of the parasites concerned.

Referring now in more detail to the manufacture and use of cobalt-releasing pellets according to the invention, each pellet should preferably release at least about 0.1 milligram of cobalt per day in soluble form as this is the approximate average daily requirement for sheep. The pellets may be formed from a mixture of the oxide, sulphate, chloride, nitrate, or other suitable compound of cobalt and a carrier binder or base, for example, clay, phenol-formaldehyde or other suitable synthetic plastic material, powdered glass, plaster of Paris, cement, borax, iron powder, or other suitable material. According to the preferred procedure, the admixture of the cobalt-containing material and the base is made into pellets and baked at a suitable temperature. If desire, small amounts of granulating agents such as sugar, starch or vegetable gums and lubricating agents such as graphite or stearic acid may be added to facilitate the mechanical processes of tableting. In addition, a relatively highly dense or heavy substance such as metallic iron may also be included in the pellet to produce a suitable mean density to ensure that the pellet will normally tend to remain in the rumeno-reticular sac of the animal. If the active or base material is not suitable for baking, other procedures for the production of the pellets would of course be used. Alternatively, a relatively insoluble compound of cobalt may be used without admixture with a base.

Copper-releasing pellets may be made generally by the same methods as are used for the production of cobalt pellets, and copper compounds similar to those mentioned for cobalt may be utilised as the active material.

Pellets containing other trace elements may be made from suitable materials containing those elements, for example, iodine-releasing pellets may be made from cuprous iodide in a plastic base or from elemental iodine contained within a plastic capsule from which the iodine ions diffuse into the rumen contents.

In the case of cobalt-releasing pellets, the pellets should be such that cobalt will dissolve from them into the rumen fluids very slowly, but at a sufficient rate to ensure the concentration adequate for the growth of the microflora responsible for the production of vitamin $B_{12}$. This requires that at least about 0.1 milligram of cobalt be released per day in soluble form. A suitable composition of cobalt-releasing pellet comprises 90% cobaltic oxide by weight and 10% clay. In early experiments, pellets containing 75% cobaltic oxide and 25% clay were tried, and although these were generally satisfactory, it was found that there was some tendency for the pellets to be rejected especially by individuals of the flocks confined to long-fibred fodder available from Phalaris-dominant pastures. The pellets containing the higher proportion of cobaltic oxide are not so liable to be rejected as the lighter pellets and it is accordingly considered desirable to use pellets having at least the specific gravity of the denser pellets (S.G. of 4). To further increase the margin of safety, pellets including finely powdered iron so as to raise the mean density or specific gravity to 4.5 have been successfully used.

The following examples describe the presently preferred processes for the production of cobalt-releasing and other types of pellets according to the invention, but it is to be clearly understood that the invention is not to be limited in any way by the following examples and use of the different types of active materials referred to therein may be made in methods of manufacture other than described. The methods of manufacture for the production of pellets in accordance with the invention are only to be restricted by the obvious limitation that materials which are decomposed by high temperatures (organic compounds for example) are not suited to manufacturing methods involving the firing of a clay or other matrix.

EXAMPLE I

Each pellet consists of a mixture of 90 parts by weight of cobaltic oxide reduced by grinding to a powder that will pass a 60 mesh sieve and 10 parts by weight of pipe clay reduced by grinding to a powder that will pass a 100 mesh to the inch sieve. These constituents are thoroughly mixed and then compressed in a die under a pressure of about 6 tons per square inch whereby 5 grams of the material are moulded into cylinders with domed ends, the overall dimensions being approximately 5/8" x 1/2" diameter. These cylinders are then baked at a temperature of 1,000 degrees centigrade for ten minutes. Pellets produced in this way are hard and porous. When immersed in water they absorb approximately 8 percent of their weight, and in this wet state they have a density close to 4.0. If a pellet of this sort is administered in such a way as to determine its passage to the rumen it will remain in the rumeno-reticular sac and give up to the rumen contents sufficient cobalt to fulfil for a considerable period the requirements of the microflora, however low the cobalt concentration of the fodder may be.

Whereas considerable tolerances in the shape and size of the pellets are admissible, the dimensions that meet the above specifications are the preferred form of the invention in so far as it relates to the long continued administration of cobalt to sheep.

Control over the rate of solution of pellets of the above type is possible by varying the firing temperature used in the preparation of the pellets. We have found that too low a firing temperature (e.g. 600° C.) yields a pellet which is too friable and which disintegrates in the rumen contents too quickly. Firing at an appreciably higher temperature than 1000° C. yields a pellet which is hard and refractory and which does not dissolve quickly enough to provide the animal with its daily requirements of cobalt. In some circumstances, however, it may be desirable to treat an animal with two or more such pellets so that sufficient cobalt is released per day into the rumen contents from all the pellets.

EXAMPLE II

Cobalt-releasing pellets having a specific gravity of over 4.7 may be made by mixing and pelleting equal weights of cobaltic oxide and finely divided (reduced) iron. The pellets are then fired in air at 600° C. for ten minutes. It appears that surface oxidation of the iron followed by reaction of the iron oxide with the cobaltic oxide, to form a spinel type of material, may explain the bonding observed as a result of the firing.

The two factors that most significantly influence the rate of solution of various cobalt compounds are, with little doubt, the pH and the oxidation-reduction potential of the rumen contents. To ensure that the requirements of the desired rumen flora are fulfilled, a cobalt-containing pellet must, as referred to above, sustain the passage into solution of at least 0.1 milligram of cobalt per day in a form readily assimilable by bacteria.

Preliminary studies revealed that cylinders (1/2 diam. x 1") made from metallic cobalt gave up, by corrosion, the required amount of cobalt when immersed in distilled water in equilibrium with air, but little, if any, when introduced into the rumen. A study was then made of the rates of solution of cobaltic oxides under conditions prescribed by the milieu of the rumen, and, as a result, the pellets made as in Example I or Example II, which meet the above requirements were developed.

EXAMPLE III

Pellets of copper oxide were prepared by taking:

| | Grams |
|---|---|
| Black copper oxide (24 mesh/cm.) | 85 |
| Clay (24 mesh/cm.) | 10 | and mixing with 10.5 ml. of a 46% w./v. solution of sodium silicate. The wet mass was granulated by passing through a 1.2 mm. hole, dried in an oven and then passed through a 6 mesh/cm. screen. The granule was blended with 0.75 gram of magnesium stearate powder and then tableted. The tablets were 13 mm. in diameter and approximately 15 mm. long. These tablets were then heated at 700° C. for 30 minutes.

The pellets so produced weighed 6 grams and had a density of about 4.0. During 16 hours immersion in a synthetic rumen fluid at 37° C. each gave off about 400 mg. of copper.

A convenient laboratory test to determine the relative release rate of a substance from pellets is to soak the pellets in a 0.1 N citric acid solution adjusted to pH 6.5 with sodium phosphate. For convenience of description this fluid is referred to as "synthetic rumen fluid." This test does not necessarily show the absolute amount of medicament which will be released in vivo—its value lies in providing comparisons.

The effect of various firing temperatures on the release rate of copper from pellets made by this method of manufacture, is clearly shown by the following:

A batch of copper pellets made as in Example III but fired at 800° C. for 30 minutes gave off 250 mg. of copper when soaked in synthetic rumen fluid for 16 hours at 37° C.

A similar batch of pellets fired at 850° C. for 30 minutes gave off 100 mg. of copper under the same conditions.

A similar batch of pellets fired at 900° C. for 30 minutes had a harder glazed appearance and gave off 25 mg. of copper when soaked for 20 hours at 37° C.

It is thus clearly apparent that there is a maximum temperature above which decomposition and/or glazing of the pellet occurs with consequent reduction of the release of active material below useful practicable limits. At the same time the release rate required for differing practical conditions can be achieved by making use of this variation or by the choice of a different matrix for the pellet such that the pellet will be "dissolved" in the rumeno-recticular sac within a chosen practical period of say 90 to 180 days. Such matrices are illustrated in Example 7 of the specification.

EXAMPLE IV

Pellets of cuprous iodide were prepared by the following method:

|  | Grams |
|---|---|
| Cuprous iodide | 120 |
| Copper powder | 60 | were passed through a standard 15 mesh/cm. screen and well mixed with 33 mls. of polyvinyl alcohol emulsion (60% w./v.). The wet mass was granulated through a 1.68 mm. hole and dried in an oven. This dry granule was passed through a 4 mesh/cm. screen, blended with 1.5 grams of finely powdered magnesium stearate and tableted. These tablets were heated in an oven at 200° C. for 1 hr. and formed hard pellets having a density of 3.0. When immersed in synthetic rumen fluid at 37° C. for 12 hours, each pellet liberated approximately 6 mgs. of iodine.

The maximum firing temperature permissible in this example is 300° C. above which decomposition of active material occurs.

EXAMPLE V

Pellets of solid iodine were prepared by carefully tableting resublimed iodine flakes. These pellets were encased in a polyethylene film of 0.05 mm. thickness giving a pellet having a density of 4 approximately. Each of these pellets released 10–12 mgms. of iodine when immersed for 12 hours in synthetic rumen fluid at 37° C.

EXAMPLE VI

Stilboestrol pellets were prepared in the laboratory using the following methods:

|  | Gm. |
|---|---|
| Diethyl stilboestrol | 0.25 |
| Iron powder | 3.3 |
| Cement | 3.7 | were mixed together and sufficient water added to form a plastic mass. This was moulded to form cylinders of 14 mm. diameter and 19 mm. length, vibrated to remove any air bubbles, and allowed to set. The density of these pellets was 3.1. Administration of these pellets to sheep by oesophageal tube and subsequent recovery after slaughtering the animals showed that the pellets had a "life" in the rumeno-reticular sac of approximately 90 to 100 days and provided stilboestrol at the rate of approximately 1 to 1.5 mg. per day to the animal. This is consistent with the accepted amount of stilboestrol needed orally for sheep to obtain a biological benefit necesary for increased growth.

EXAMPLE VII

Penicillin pellets were prepared as follows:

|  | Gm. |
|---|---|
| Procaine penicillin | 1.0 |
| Iron powder | 3.3 |
| Plaster of Paris | 2.5 | were mixed together and sufficient water added to form a slurry. This was poured into moulds of 14 mm. diameter and 19 mm. length and allowed to set. The pellets so formed had a density of about 3. Administration of these pellets to sheep and subsequent recovery by slaughter after five days showed that the pellets had "dissolved" at a rate of approximately 1 gm. per day, so that the pellets remain effective for a period of approximately six days. This period is suitable for treatment of certain types of infections with oral penicillin where a daily dosage of approximately 100,000 I.U. penicillin is desired.

Figure 1:
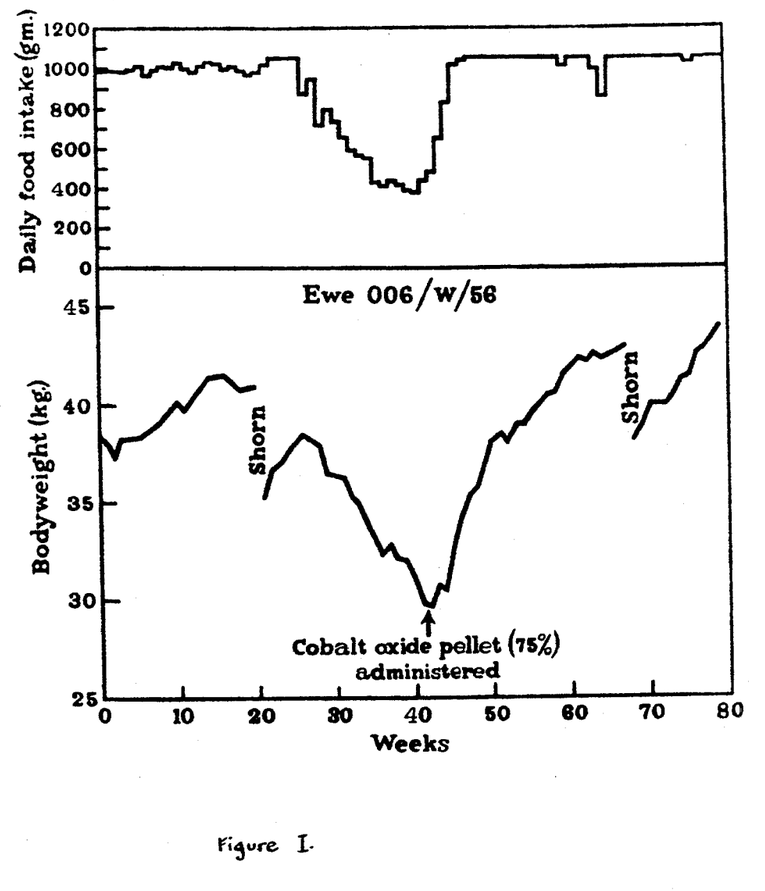

Reference will now be made to FIGURE 1 of the accompanying drawings which graphically illustrates the effects upon appetite and body weight which followed administration of a cobalt oxide pellet made by the process of Example I. The effects are typical of the response that supervenes when the low vitamin $B_{12}$-status of a cobalt-deficient sheep is reinstated to normal either by frequent administration of an appropriate amount of vitamin $B_{12}$ per os or parenterally, or by the administration of sufficient cobalt per os to ensure that the nature of the microflora in the rumen contents is no longer influenced by a shortage of cobalt. The experimental ewe was confined during the whole period to a pen and offered each day a ration comprised of 1 kg. of Co-deficient cereal hay plus 50 gm. of washed gluten, the mixture containing 0.03 gm. Co/gm. dry weight.

Figure 2:
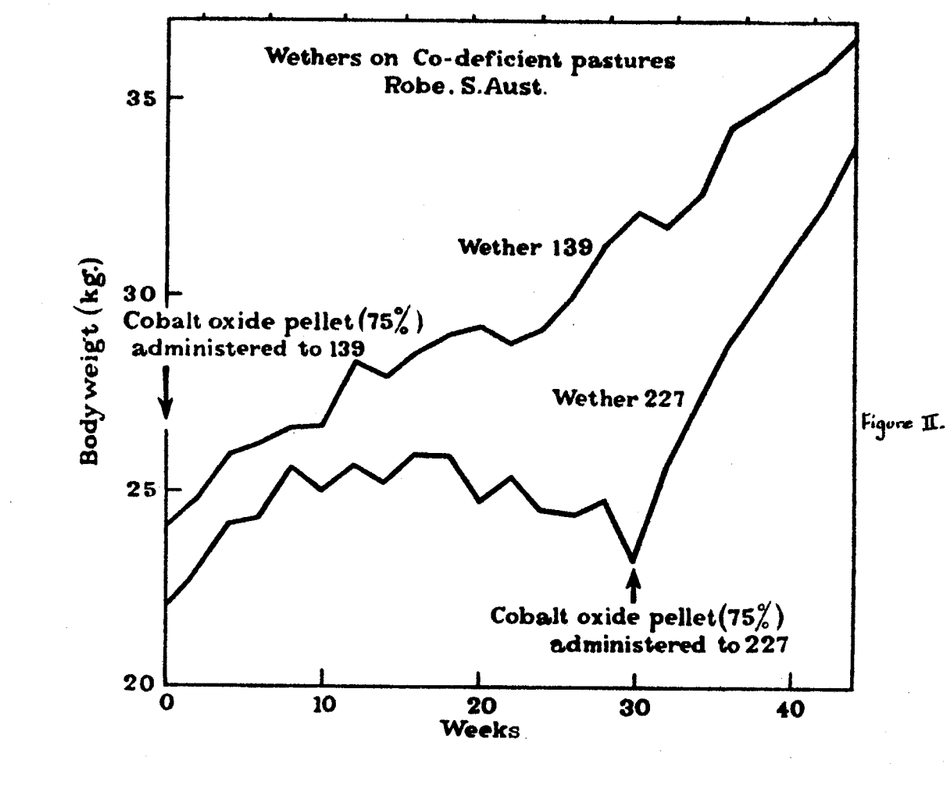

FIGURE 2 of the drawings shows that the administration of pellets to two animals on cobalt defficient pastures at Robe, South Australia, elicited a response similar to that which supervenes on frequent (3 times weekly) drenching with an adequate supplement of cobalt.

*Experiment 6*

Six groups of sheep were taken at three different field locations and at each location one group was treated with cobalt pellets made as in Example I and the other not treated. Again the pellets were administered by simple oesophageal tube and the outbreaks of Phalaris staggers occurred at each of the three stations at eight or twelve weeks after treatment. The results clearly show that biologic protection against Phalaris staggers was conferred by the treatment with the cobalt pellet:

TABLE V

| Location | Number of sheep with Phalaris staggers/number of sheep exposed | | Interval between treatment and outbreak, weeks |
|---|---|---|---|
|  | Treated Co pellets | Not treated |  |
| Station A | 0/70=Nil | 10/30=33.3% | 8 |
| Station B | 3/223=1.3% | 30/50=60% | 8 |
| Station C | 2/126=1.6% | 13/37=35% | 12 |

Investigation of the treated animals which developed Phalaris staggers showed that these animals had shed their pellets.

The incidence of Phalaris staggers in the control (untreated) groups presents a conservative picture, as the control groups were removed from the particular pasture when the above outbreaks had occurred.

It may be concluded that the cobalt pellet made according to the formula as in Example I releases to the animal at least 0.1 mgm. of cobalt daily. It is well known that the normal nutritional requirements of cobalt for sheep is less than the amount of cobalt which is necessary to prevent the disease Phalaris staggers. Thus these pellets are an effective way of providing the nutritional requirements of cobalt to sheep over long periods.

*Experiment 7*

Pellets containing 85% cupric oxide in a China clay matrix were prepared according to Example III and fired at 700° C. These pellets were then administered by an oesophageal tube to six sheep. The liver copper concentrations were determined by biopsy and analysis using standard techniques for these operations. Three control sheep which had been kept on the same diet were also biopsied and their liver copper concentrations established. These three sheep served as controls throughout the experiment, the ration for all animals being an artificial diet adequate in all respects except for copper. Thirty-five to forty-one days after administration, liver biopsy was repeated and the liver copper concentrations at that time established by assay. It was found that in the three control sheep (untreated) the liver copper concentrations had varied by −9, −16 and +90 parts per million of copper respectively. In the six treated sheep, however, the liver copper concentrations had increased by amounts which ranged from +176 to +358 p.p.m. of copper. Thus these copper pellets were yielding to the animal somewhere in the region of 200–400 p.p.m. copper in 35 to 41 days.

The formulation of a practical copper pellet will vary in different geographical areas because different pastures provide different amounts of copper, and copper storage by animals can be influenced by the molybdenum and sulphate content of the pasture. An excess of copper can be toxic. As described above, it is possible to vary the rate of release of copper to the animal and the best rate must be determined according to the type of animal and the location and type of pasture on which it will be grazed.

Biologically copper is necessary for proper growth and development of cattle, but there is a wider margin between the amount required for nutritional purposes and excessive amounts necessary to produce toxic symptoms than is the case with sheep. For this reason the permissible specification for copper pellets for cattle is wider in respect to the critical factor, namely temperature of firing, than in the case of pellets for use with sheep. However, the best conditions of manufacture to provide the desired release rate of copper will vary from area to area according to the natural supply of copper (and the amount of molybdenum and sulphate present) from the pasture of the area.

As the copper requirement of an animal is normally much higher than that of cobalt, the administration of several pellets containing copper may be of advantage. Similarly, if it is desired that a higher than normal amount of cobalt be released into the rumen contents in soluble form per day, two or more cobalt-releasing pellets could be administered as required.

*Experiment 8*

Pellets embodying steel tubes of ½″ diameter, in lengths of ½″ and ¾″ as a shell or container for biologically active substances, were administered to sheep. These tubes weighed approximately 4¼ gm. for the ½″ length and approximately 6 gm. for the ¾″ length, their density when filled with water being 3.3. None of these tubes were rejected by sheep over a period of 14 days. This experiment indicates that a hollow container filled with a suitable biologically active substance is satisfactorily retained by ruminants provided the conditions relating to density and weight are fulfilled. Pellets in such a "container" form to supply stilboestrol to ruminants were prepared in which the contents consisted of:

| | Gm. |
|---|---|
| Magnesium oxide (heavy) | 5 |
| Magnesium chloride | 3.25 |
| Stilboestrol | 3 |

These substances were mixed together intimately in a dry state and then 5 mls. water added and the whole mixed to a smooth paste. This material was then quickly packed into six pieces of steel tubing (14 gauge) each piece being ½″ outside diameter and ¾″ long and the mixture allowed to set. Each resulting pellet thus contained 0.5 gm. stilboestrol and the total weight was approximately 9 gms. These pellets were then administered to sheep by means of an oesophageal tube and recovered from the rumeno-reticular sac of the sheep by slaughtering 15 days later. It was found that the medicament had been leached from the containers and assay of the stiboestrol contained in the residuum showed that on the average 2.7 mg. of stilboestrol had been released daily to each animal.

This experiment showed that the "container" type of pellet is an effective and practical means of supplying biologically active substances to ruminants. The quantity and kind of medicament incorporated into pellets of this type will be determined by the purpose for which the pellets are intended. The selection of a suitable net weight of each pellet will be obvious to those skilled in the art. "Container" type of pellets in which the ends are closed and a protruding wick is provided, along which metal ions, such as cobalt, migrate from the "container" into the rumeno-reticular sac, are also contemplated.

Pellets according to this invention should be administered in such a manner that the animal swallows it. The usual means of ensuring this in practice are:

(*a*) To administer the pellet to the back of the tongue or mouth by means of a balling gun. This method is not ideal as it is well known that some animals can hold objects at the back of the tongue for a time and subsequently eject them.

(*b*) To deliver the pellet into the oseophagus by means of an oseophageal tube or other suitable instrument designed for the purpose. Pellets so administered or swallowed by the animal find their way into, and normally remain in, the rumeno-reticular sac.

It would also be possible to administer a pellet through the skin, but such a procedure would be undertaken only in particular circumstances, such as in the case of the administration of the pellets to range cattle.

The expressions "relatively permanently" and "relatively permanent" as used herein are related to the period of time over which the biologically active substance is to be released from the pellets into the contents of the rumeno-reticular sac, the density and weight of the pellets causing them to remain in the sac for at least the appropriate period of time rather than passing into the alimentary tract and being eliminated, which otherwise would occur.

This application is a continuation-in-part of application Serial No. 693,007, filed October 29, 1957, now abandoned.

I claim:

1. A pellet for administration to a ruminant to supply it with a biologically active substance for an extended period of time, said pellet having a density within the range 2.5 to 7 and a weight within the range of 1 to 75 grams so as to be relatively permanently retained in the rumeno-reticular sac of the ruminant after administration and lodgment in the sac, said pellet being sufficiently durable to resist disintegration in the contents of said sac over said extended period of time, and said pellet embodying a biologically active substance which is released from the pellet into solution in the contents of the sac in an amount of at least 0.1 milligram per day over the extended period of time.

2. A pellet for administration to a ruminant to supply it with a biologically active substance for an extended period of time, said pellet embodying a biologically active substance and having a density within the range of 3.5 to 5.5 and a weight within the range of 5 to 30 grams so as to be relatively permanently retained in the rumeno-reticular sac of the ruminant after administration and lodgement in the sac, said pellet being sufficiently durable in the contents of the sac so as to resist disintegration therein over said extended period of time, the biologically active substance being free for release from the pellet in soluble form into the contents of the rumeno-reticular sac of the animal in an amount of at least 0.1 milligram per day over the extended period of time.

3. A pellet for administration to a ruminant to supply it with a biologically active substance for an extended period of time, said pellet comprising a mass of particles of a biologically active substance selected from the group consisting of substances supplying a mineral trace element, an anti-bloat agent, an antibiotic, an anthelmintic and a hormone, and a metallic sheath containing said particles, the metal of the sheath having a density exceeding 2.5 and the pellet, as a whole, having a mean density within the range of 2.5 to 7 and a weight within the range of 1 to 75 grams so as to be relatively permanently retained in the rumeno-recticular sac of the ruminant after administration and lodgement in the sac, said metal being durable in the contents of the sac, and the biologically active substance being accessible and free for release from said sheath of the pellet in soluble form into the contents of the sac in an amount of at least 0.1 milligram per day over the extended period of time.

4. A pellet for administration to a ruminant to supply it with a biologically active substance for an extended period of time, said pellet comprising a metallic core and particles of a biologically active substance selected from the group consisting of substances supplying a mineral trace element, an anti-bloat agent, an antibiotic, an anthelmintic and a hormone, molded around said core, the metal of the core having a density exceeding 2.5 and the pellet, as a whole, having a mean density within the range of 2.5 to 7 and a weight within the range of 1 to 75 grams so as to be relatively permanently retained in the rumeno-recticular sac of the ruminant after administration and lodgement in the sac, said metallic core being durable in the contents of the sac, and the biologically active substance being free for release from the pellet in soluble form into the contents of the sac in an amount of at least 0.1 milligram per day over the extended period of time.

5. A pellet for administration to a ruminant to supply it with a biologically active substance for an extended period of time, said pellet comprising particles of a biologically active substance selected from the group consisting of substances supplying a mineral trace element, an anti-bloat, an antibiotic, an anthelmintic and a hormone, in admixture with particles of a metal having a density exceeding 2.5 and molded in pellet-form, the pellet having a mean density in the range 2.5 to 7 and a weight within the range of 1 to 75 grams so as to be relatively permanently retained in the rumeno-reticular sac of the ruminant after administration and lodgement in the sac, said pellet being sufficiently durable to resist disintegration in the contents of the sac over the extended period of time, the biologically active substance being free for release from the pellet in soluble form into the contents of the sac in an amount of at least 0.1 milligram per day over the extended period of time.

6. The method of treating ruminants, comprising administering pellets to a ruminant so as to lodge said pellets in the rumeno-recticular sac of the ruminant and supply the latter with a biologically active substance over an extended period of time, said pellets embodying a biologically active substance and having a density within the range 2.5 to 7 and a weight within the range of 1 to 75 grams so as to be relatively permanently retained in the rumeno-recticular sac of the ruminant after administration and lodgement in the sac, the pellets further being sufficiently durable to resist disintegration in the contents of the sac over said extended period of time, the biologically active substance being free for release from the pellets in soluble form into the contents of the sac in an amount of at least 0.1 milligram per day over the extended period of time.

7. The method of treating ruminants, comprising administering pellets to a ruminant so as to lodge said pellets in the rumeno-reticular sac of the ruminant and supply the latter with a biologically active substance over an extended period of time, said pellets embodying a biologically active substance and having a density within the range of 3.5 to 5.5 and a weight within the range of 5 to 30 grams so as to be relatively permanently retained in the rumeno-reticular sac of the ruminant after administration and lodgement in the sac, the pellets being sufficiently durable in the contents of the sac so as to resist disintegration therein over said extended period of time, and the biologically active substance being free for release from the pellets in soluble form into the contents of the rumeno-recticular sac of the ruminant in an amount of at least 0.1 milligram per day over the extended period of time.

8. The method of treating ruminants, comprising administering pellets to a ruminant so as to lodge said pellets in the rumeno-reticular sac of the ruminant and supply the latter with a biologically active substance over an extended period of time, each of said pellets comprising a mass of particles of a biologically active substance selected from the group consisting of substances supplying a mineral trace element, an anti-bloat agent, an antibiotic, an anthelmintic and a hormone, and a metallic sheath containing said particles, the metal of the sheath having a density exceeding 2.5 and the pellets having a mean density within the range of 2.5 to 7 and a weight within the range of 7 to 75 grams so as to be relatively permanently retained in the rumeno-recticular sac of the ruminant after administration and lodgement in the sac, said sheath being durable in the contents of the sac over said extended period of time, and the biologically active substance being accessible and free for release in soluble form from said sheath of the pellet into the contents of the sac in an amount of at least 0.1 milligram per day over the extended period of time.

9. The method of treating ruminants, comprising administering pellets to a ruminant so as to lodge said pellets in the rumeno-reticular sac of the ruminant and to supply the latter with a biologically active substance over an extended period of time, each of said pellets comprising a metallic core and particles of a biologically active substance selected from the group consisting of substances supplying a mineral trace element, an anti-bloat agent, an antibiotic, an anthelmintic and a hormone, molded around said core, the metal of the core having a density exceeding 2.5 and the pellets having a mean density within the range of 2.5 to 7 and a weight within the range of 1 to 75 grams so as to be relatively permanently retained in the rumeno-recticular sac of the ruminant after administration and lodgement in the sac, said metallic core being durable in the contents of the sac to resist disintegration therein over said extended period of time, and the biologically active substance being free for release from the pellets in soluble form into the contents of the sac in an amount of at least 0.1 milligram per day over the extended period of time.

10. The method of treating ruminants, comprising administering pellets to a ruminant so as to lodge said pellets in the rumeno-reticular sac of the ruminant and to supply the latter with a biologically active substance over an extended period of time, said pellets comprising particles of a biologically active substance selected from the group consisting of substances supplying a mineral trace element, an anti-bloat agent, an antibiotic, an anthelmintic and a hormone, in admixture with particles of a metal having a density exceeding 2.5 and molded in pellet-form, the pellets having a mean density in the range 2.5 to 7 and a weight within the range of 1 to 75 grams so as to be relatively permanently retained in the rumeno-recticular sac of the ruminant after administration and lodgement in the sac, said pellets being durable in the contents of said sac to resist disintegration therein over said extended period of time, and the biologically active substance being free for release from the pellets in soluble form into the contents of the sac in an amount of at least 0.1 milligram per day over the extended period of time.

(References on following page)

References Cited in the file of this patent

UNITED STATES PATENTS

| | | |
|---|---|---|
| 1,589,081 | Adler | June 15, 1926 |
| 2,112,167 | Laszlo | Mar. 22, 1938 |
| 2,517,513 | Vaernet | Aug. 1, 1950 |
| 2,671,451 | Bolger | Mar. 9, 1954 |
| 2,696,455 | Blair | Dec. 7, 1954 |
| 2,773,502 | Kaslow | Dec. 11, 1956 |
| 2,895,880 | Rosenthal | July 21, 1959 |
| 2,951,792 | Swintosky | Sept. 6, 1960 |

FOREIGN PATENTS

| | | |
|---|---|---|
| 547,858 | Great Britain | Sept. 15, 1942 |

OTHER REFERENCES

J. Animal Science, art. by Barrentin et al., May 1956, pp. 440–446.

Manufacturing Chemist, art. by Watson, January 1944, pp. 17–20.

Drug Trade News, Nov. 4, 1957, 32:22, page 54.